United States Patent
Sakuma et al.

(10) Patent No.: US 11,409,256 B2
(45) Date of Patent: Aug. 9, 2022

(54) INFORMATION PROCESSING DEVICE, INFORMATION PROCESSING METHOD AND NON-TRANSITORY COMPUTER-READABLE STORAGE MEDIUM FOR SYNCHRONIZING EDITED CONTENT OF CONTROL PROGRAMS

(71) Applicant: OMRON Corporation, Kyoto (JP)

(72) Inventors: Takashi Sakuma, Ibaraki (JP); Kenjiro Nagao, Nagaokakyo (JP); Chieko Sato, Kusatsu (JP); Naoto Hasegawa, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,564

(22) PCT Filed: Aug. 28, 2018

(86) PCT No.: PCT/JP2018/031633
§ 371 (c)(1),
(2) Date: Feb. 15, 2020

(87) PCT Pub. No.: WO2019/054166
PCT Pub. Date: Mar. 21, 2019

(65) Prior Publication Data
US 2020/0225633 A1 Jul. 16, 2020

(30) Foreign Application Priority Data
Sep. 15, 2017 (JP) .............................. JP2017-177468

(51) Int. Cl.
*G05B 19/05* (2006.01)
*G06F 8/71* (2018.01)
(Continued)

(52) U.S. Cl.
CPC .......... *G05B 19/056* (2013.01); *G06F 8/313* (2013.01); *G06F 8/60* (2013.01); *G06F 8/71* (2013.01)

(58) Field of Classification Search
None
See application file for complete search history.

(56) References Cited

U.S. PATENT DOCUMENTS 8,881,298 B2 * 11/2014 Furuichi ............... G06F 21/608
  726/26
10,628,143 B2 * 4/2020 Niwa ....................... G06F 8/47
(Continued)

FOREIGN PATENT DOCUMENTS

JP H0310304 1/1991
JP 2000163107 6/2000
(Continued)

OTHER PUBLICATIONS

Microsoft Computer Dictionary 5th ed. 2002, p. 38 (Year: 2002).*
(Continued)

*Primary Examiner* — Jason D Mitchell
(74) *Attorney, Agent, or Firm* — JCIPRNET

(57) ABSTRACT

This information processing device is provided with an editing unit and a storage unit. The editing unit performs editing on one or more controller data sets that contain control programs to be executed on a control device. The storage unit stores a sharing setting table indicative of sharing settings of the control programs included in the respective controller data sets. When the control program for a first controller data set and the control program for a second controller data set that are included in the plurality of controller data sets are set to be shared, the editing unit
(Continued)

synchronizes the edited content for the control program for the first controller data set with the control program for the second controller data set.

9 Claims, 11 Drawing Sheets

(51) Int. Cl.
  *G06F 8/60* (2018.01)
  *G06F 8/30* (2018.01)

(56) References Cited

U.S. PATENT DOCUMENTS

| | | | | |
|---|---|---|---|---|
| 10,705,500 | B2* | 7/2020 | Unno | G05B 19/056 |
| 2002/0193905 | A1* | 12/2002 | Davison | G05B 19/4185 |
| | | | | 700/180 |
| 2005/0085928 | A1* | 4/2005 | Shani | G05B 19/056 |
| | | | | 700/18 |
| 2006/0168441 | A1* | 7/2006 | Fujinawa | G06F 8/60 |
| | | | | 713/2 |
| 2006/0206860 | A1 | 9/2006 | Dardinski et al. | |
| 2007/0208782 | A1* | 9/2007 | Carter | H04M 1/72406 |
| 2009/0276059 | A1* | 11/2009 | Tone | G05B 19/052 |
| | | | | 700/7 |
| 2010/0049337 | A1* | 2/2010 | Sakagami | G05B 19/058 |
| | | | | 700/26 |
| 2012/0110559 | A1* | 5/2012 | Dolinsky | G06F 8/45 |
| | | | | 717/143 |
| 2012/0239201 | A1* | 9/2012 | Kobayashi | G05B 19/056 |
| | | | | 700/275 |
| 2014/0149348 | A1* | 5/2014 | Choi | G06F 8/65 |
| | | | | 707/624 |
| 2014/0207254 | A1 | 7/2014 | Nishiyama et al. | |
| 2016/0231733 | A1* | 8/2016 | Nagatani | G05B 19/4097 |
| 2017/0075335 | A1* | 3/2017 | Takeuchi | G05B 19/056 |
| 2017/0223209 | A1* | 8/2017 | Nakamura | H04N 1/00344 |
| 2018/0147648 | A1* | 5/2018 | Ueno | B23K 20/00 |
| 2018/0210414 | A1* | 7/2018 | Ino | G05B 19/056 |
| 2018/0210415 | A1* | 7/2018 | Unno | G05B 19/056 |
| 2018/0307194 | A1* | 10/2018 | Kato | G05B 19/054 |
| 2019/0369588 | A1* | 12/2019 | Amano | H04L 12/2803 |

FOREIGN PATENT DOCUMENTS

| | | |
|---|---|---|
| JP | 2015018349 | 1/2015 |
| JP | 2016091066 | 5/2016 |

OTHER PUBLICATIONS

Translation of JP 2000163107A provided by Espacenet <https://worldwide.espacenet.com/> on Mar. 25, 2021. (Year: 2000).*

"International Search Report (Form PCT/ISA/210)" of PCT/JP2018/031633, dated Oct. 30, 2018, with English translation thereof, pp. 1-2.

"Written Opinion of the International Searching Authority (Form PCT/ISA/237)" of PCT/JP2018/031633, dated Oct. 30, 2018, with English translation thereof, pp. 1-8.

"Search Report of Europe Counterpart Application", dated May 10, 2021, pp. 1-8.

* cited by examiner

```
PD(Project Data)
├──CD1(Controller Data1)
│       ├──CFD(Configuration Data)
│       └──PRGD(Program Data)
│                ├──PRG1(Program1)
│                ├──PRG2(Program2)
│                └──PRG3(Program3)
├──CD2(Controller Data2)
│       ├──CFD(Configuration Data)
│       └──PRGD(Program Data)
│                ├──PRG1(Program1)
│                ├──PRG2(Program2)
│                └──PRG3(Program3)
└──CD3(Controller Data3)
        ├──CFD(Configuration Data)
        └──PRGD(Program Data)
                 ├──PRG1(Program1)
                 ├──PRG2(Program2)
                 └──PRG3(Program3)
```

| Controller1 | | Controller2 | | Controller3 | |
|---|---|---|---|---|---|
| ○ | Program0 | ○ | Program0 | ○ | Program0 |
| ○ | Program1 | ○ | Program1 | ○ | Program1 |
| ○ | Program2 | ○ | Program2 | ○ | Program2 |

(B)

| Controller1 | | Controller2 | | Controller3 | |
|---|---|---|---|---|---|
| ○ | Program0 | ● | Program0 | ▲ | Program0 |
| ○ | Program1 | ● | Program1 | ▲ | Program1 |
|   | Program2 | ▲ | Program2 | ▲ | Program2 |

(C)

| Controller1 | | Controller2 | | Controller3 | |
|---|---|---|---|---|---|
| ○ | Program0 | ○ | Program0 | ○ | Program0 |
| ○ | Program1 | ○ | Program1 | ○ | Program1 |
|   | Program2 |   | Program2 |   | Program2 |

INFORMATION PROCESSING DEVICE, INFORMATION PROCESSING METHOD AND NON-TRANSITORY COMPUTER-READABLE STORAGE MEDIUM FOR SYNCHRONIZING EDITED CONTENT OF CONTROL PROGRAMS

CROSS-REFERENCE TO RELATED APPLICATION

This application is a 371 application of the International PCT application serial no. PCT/JP2018/031633, filed on Aug. 28, 2018, which claims the priority benefits of Japan Patent Application No. 2017-177468, filed on Sep. 15, 2017. The entirety of each of the above-mentioned patent applications is hereby incorporated by reference herein and made a part of this specification.

BACKGROUND

Technical Field

The invention relates to an information processing technique that supports development of a project used for a control device.

Description of Related Art

Currently, a programmable logic controller (hereinafter, referred to as PLC) is widely used as an industrial control device.

The PLC controls various devices connected to the PLC by executing a preset control program.

The control program given to the PLC control is edited by an information processing device such as a PC (personal computer), as disclosed in Patent Document 1, for example. Such an information processing device is provided with a program (editing program) for creating and editing the control program.

RELATED ART

Patent Document

[Patent Document 1] Japanese Laid-Open No. 2016-91066

SUMMARY

Problems to be Solved

For the information processing device provided with the conventional editing program as disclosed in Patent Document 1, it is necessary to create a new control program for each controller. Further, although it is possible to simply copy one control program in the conventional information processing device, each of a plurality of control programs has to be edited individually. Therefore, even if the same editing is performed on a plurality of control programs, the same editing has to be performed individually for each control program.

As described above, with the conventional information processing device, it may take time and effort to edit a plurality of control programs.

Therefore, the invention is to facilitate the editing for a plurality of control programs.

Means for Solving the Problems

In an example of the disclosure, an information processing device includes an editing unit and a storage unit. The editing unit edits one or a plurality of pieces of controller data including control programs to be executed by control devices. The storage unit stores a sharing setting table indicating a sharing setting of the control programs respectively included in the plurality of pieces of controller data. When control programs of first controller data and control programs of second controller data included in the plurality of pieces of controller data are set to be shared, the editing unit synchronizes an edited content for the control programs of the first controller data with the control programs of the second controller data.

In this configuration, the edited content of the first controller data is automatically reflected to the second controller data by the sharing setting. The sharing setting does not mean that the control program itself is shared, but means that the contents of a plurality of control programs are always set to be the same. In addition, the synchronization of the control programs is a process of matching the contents of the control programs.

In an example of the disclosure, when the second controller data is created by copying the first controller data, the editing unit performs the following process. If sharing is selected for all the control programs included in the first controller data, the editing unit sets all the control programs included in the second controller data to share with all the control programs included in the first controller data, and stores the sharing setting in the sharing setting table.

In this configuration, controller data with all the control programs set to be shared is easily created, and the sharing setting content is automatically stored.

In an example of the disclosure, when the second controller data is created by copying the first controller data, the editing unit performs the following process. If sharing is selected for the control program, which is already set to be shared, included in the first controller data, the editing unit sets the control program copying the control program, which is already set to be shared, included in the second controller data to share with the control program, which is already set to be shared, included in the first controller data, and stores the sharing setting in the sharing setting table.

In this configuration, controller data reflecting sharing information that is already set is easily created, and the sharing setting content is automatically stored.

In an example of the disclosure, when receiving a change of the sharing setting, the editing unit reflects a changed content in the sharing setting table.

In this configuration, the content of the sharing setting can be changed after copying, and the flexibility in creating controller data is improved.

In an example of the disclosure, when synchronizing the control program, the editing unit synchronizes a variable used in the control program, and sets a content of the variable asynchronous. The synchronization of the variable is to match the variable names. The asynchronization of the contents of the variables is to set a state where the contents of the variables can be set as appropriate respectively.

In this configuration, when the settings are different for the devices to be controlled, the same setting is not made to the control devices to prevent an unintentional malfunction.

In an example of the disclosure, the information processing device includes a display unit displaying an editing screen of the controller data. The editing unit assigns a mark indicating the sharing setting to the control program set to be shared, and displays the mark on the display unit.

In this configuration, the state of the sharing setting for each control program is visually recognized by the programmer easily.

Effects

According to the invention, a plurality of control programs can be edited easily.

BRIEF DESCRIPTION OF THE DRAWINGS

FIG. 3 is a diagram showing an example of the configuration of data created by the information processing device according to the embodiment of the invention.

(A) of FIG. 4, (B) of FIG. 4, and (C) of FIG. 4 are diagrams showing an example of a sharing setting table according to the embodiment of the invention.

Figure 5:
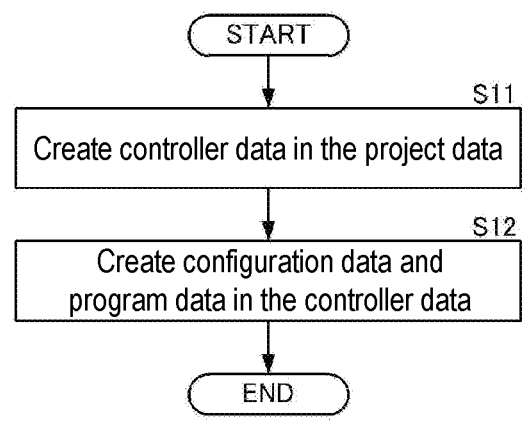

FIG. 5 is a flowchart showing an example of a process of creating project data.

Figure 6:
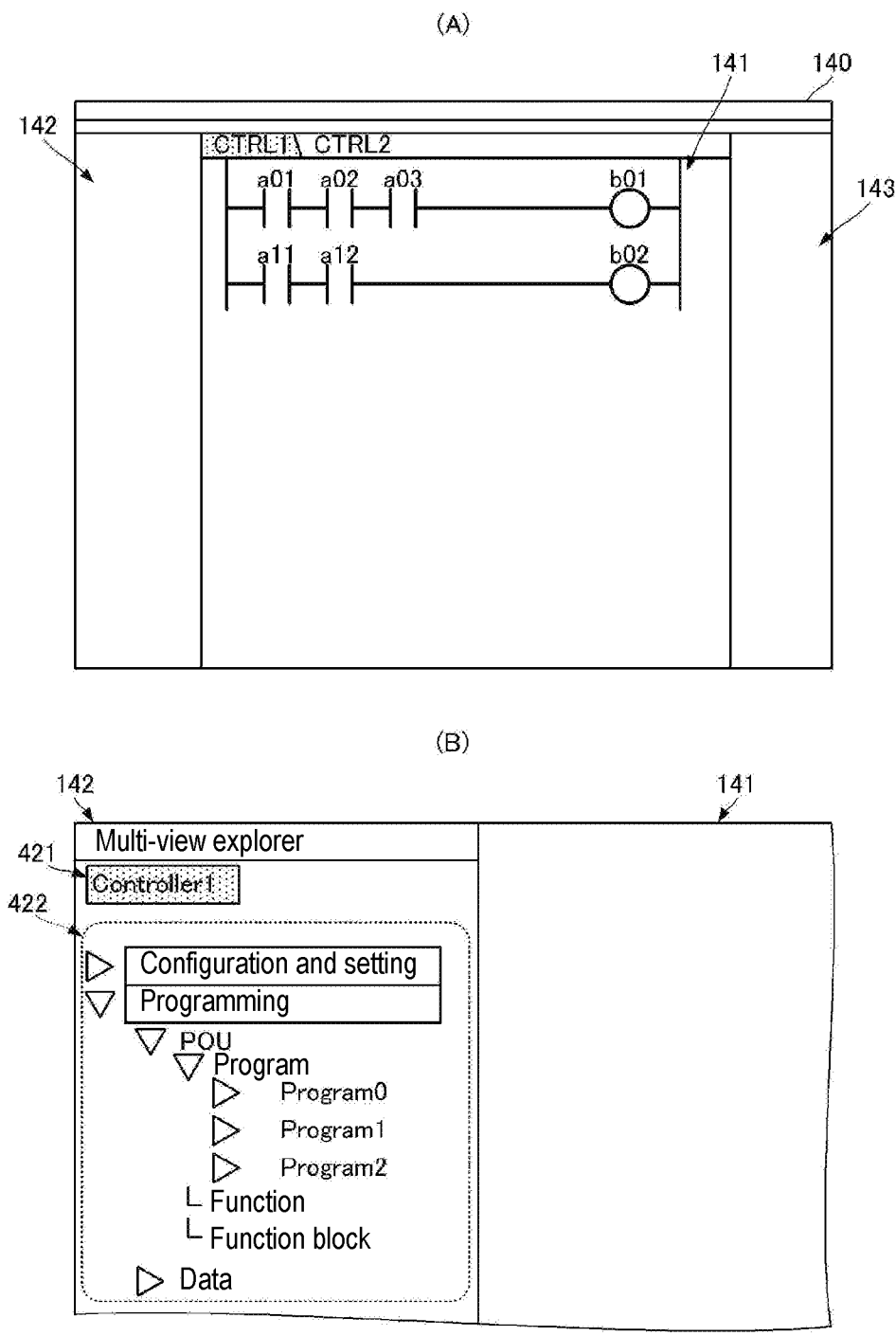

(A) of FIG. 6 is a diagram showing an example of an editing screen, and (B) of FIG. 6 is an enlarged diagram showing an example of a multi-view explorer window in the editing screen.

Figure 7:
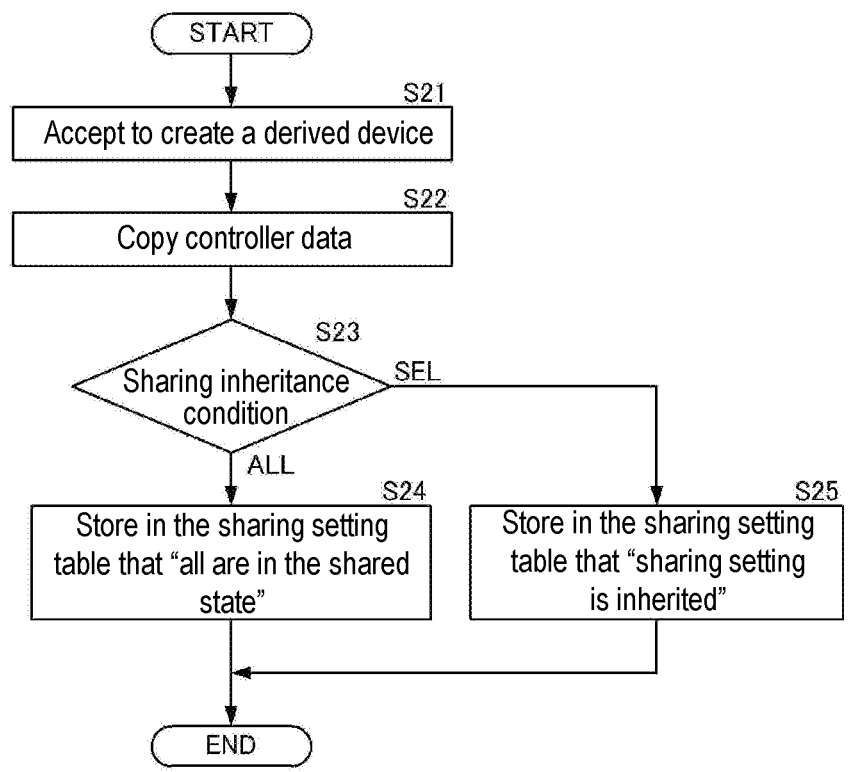

FIG. 7 is a flowchart showing an example of a process of copying controller data (creating a derived device).

Figure 8:
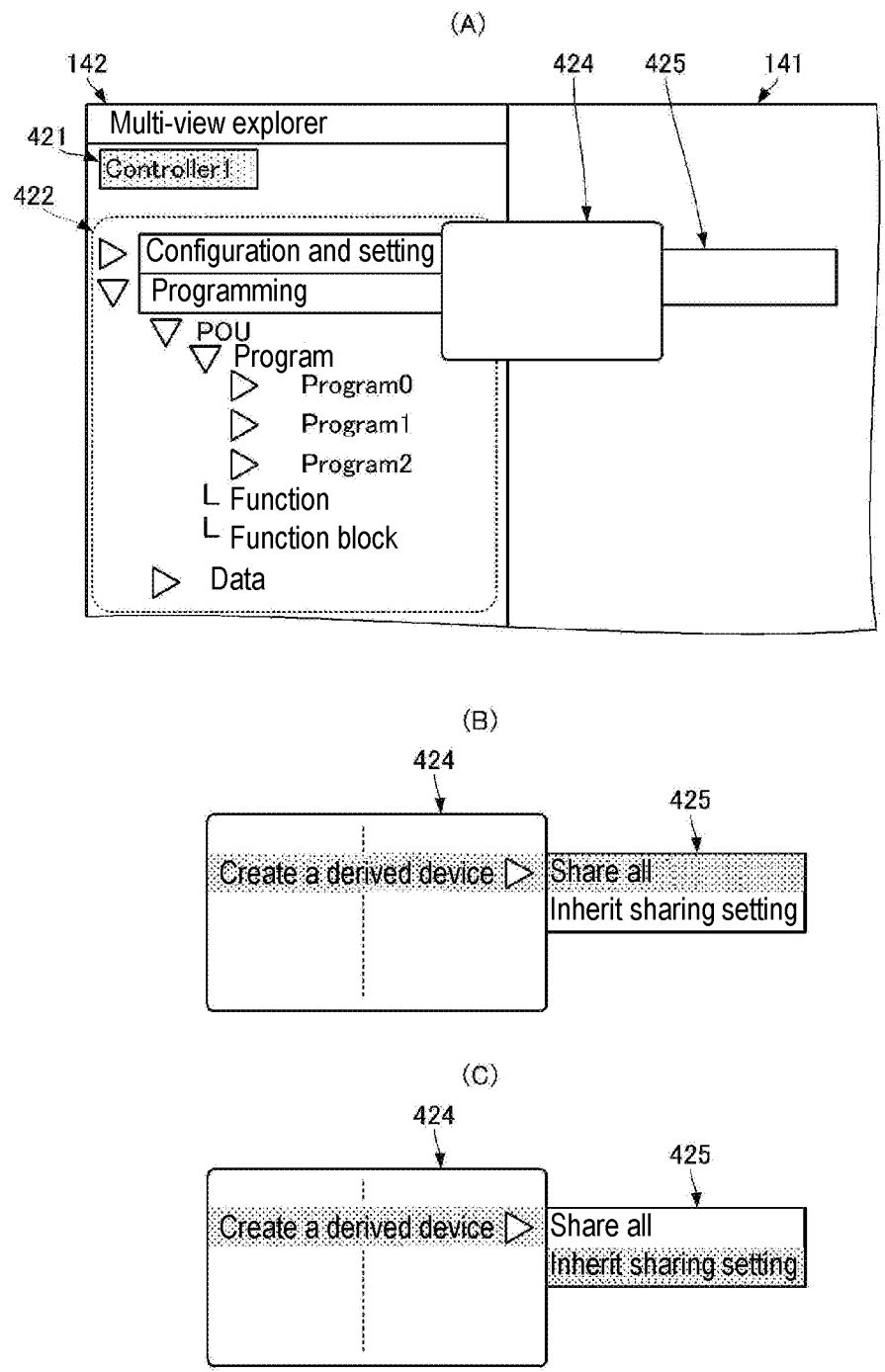

(A) of FIG. 8 is an enlarged diagram of the editing screen showing a state of instructing the process of copying controller data (creating a derived device), (B) of FIG. 8 is a diagram showing a state of selecting a tab for sharing all, and (C) of FIG. 8 is a diagram showing a state of selecting a tab for inheriting the sharing setting.

Figure 9:
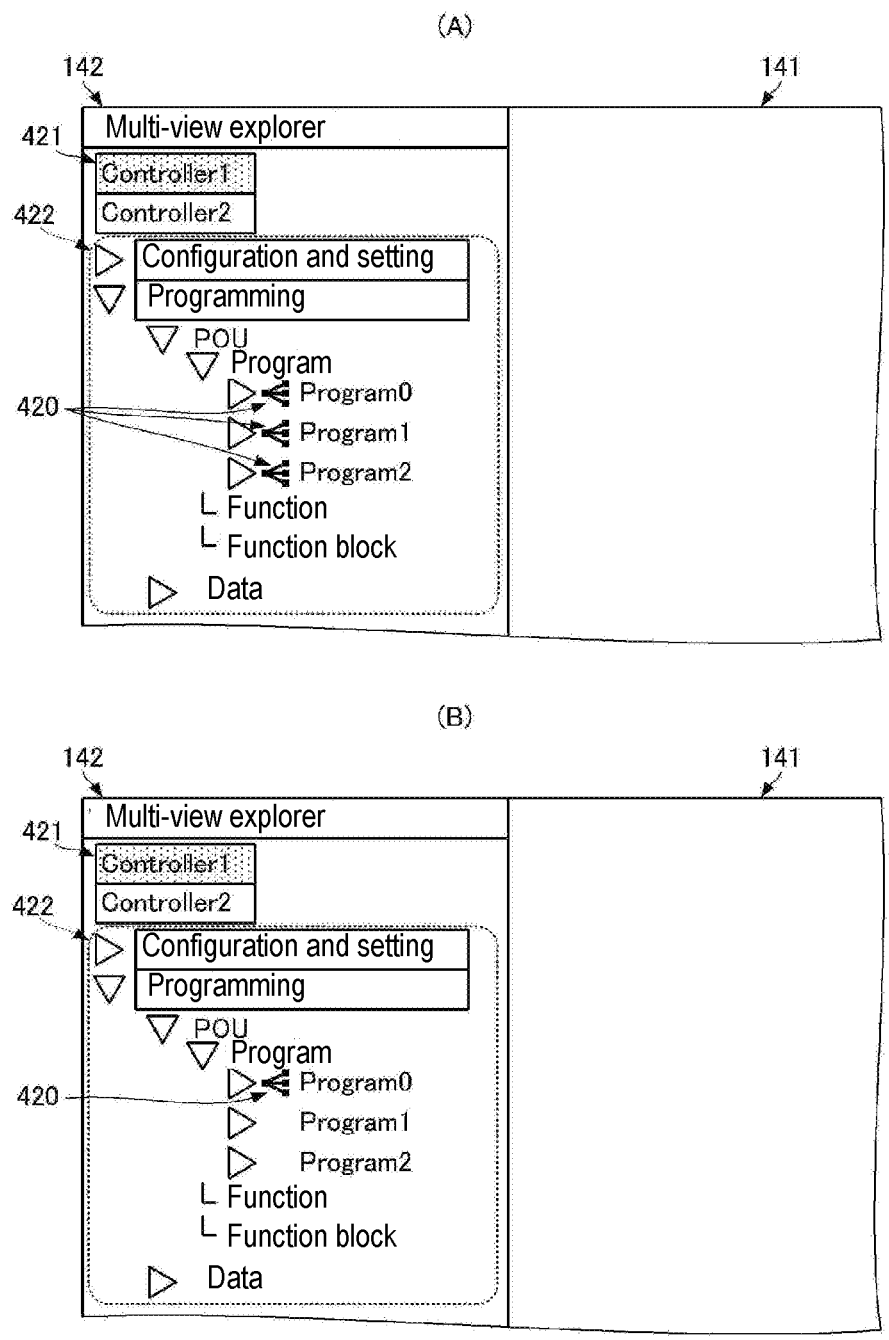

(A) of FIG. 9 and (B) of FIG. 9 are enlarged diagrams of the multi-view explorer window when a control program in a shared state is present.

Figure 10:
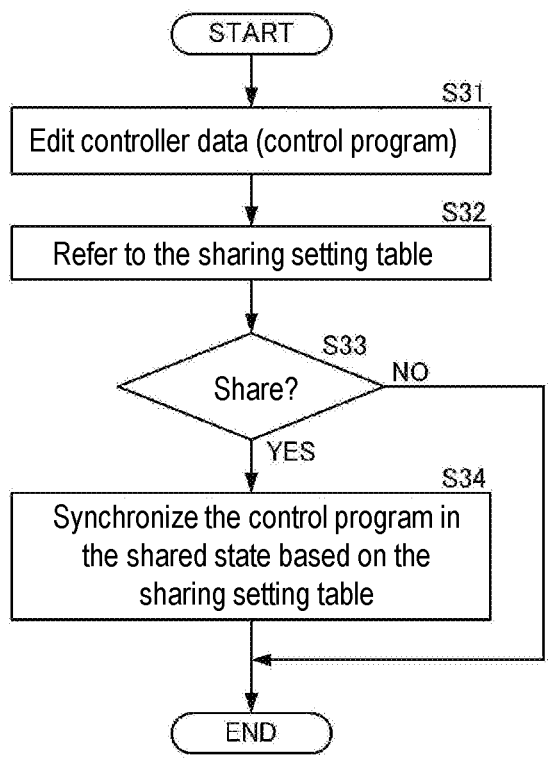

FIG. 10 is a flowchart showing an example of a process of synchronizing control programs between controller data.

Figure 11:
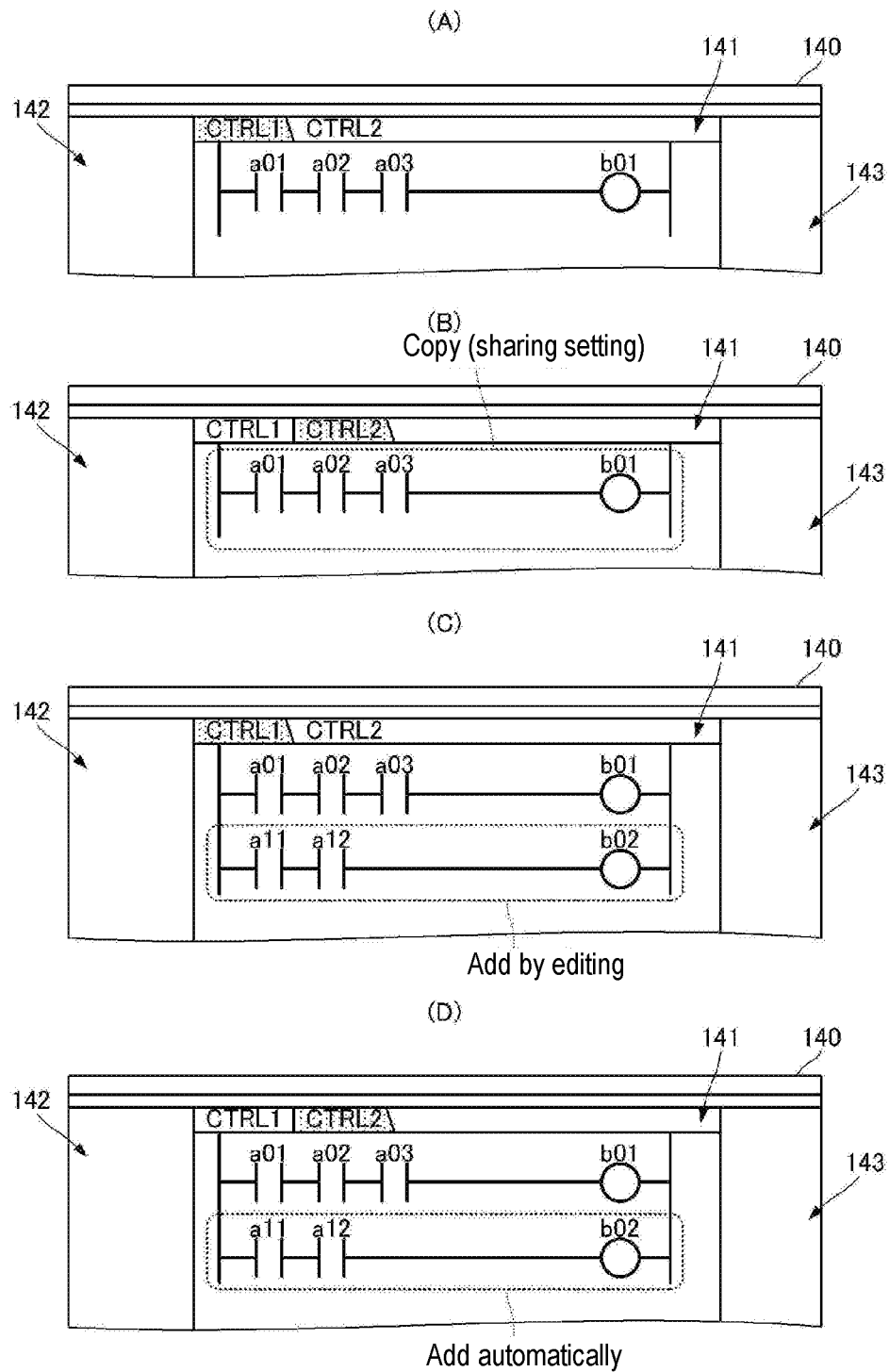

(A) of FIG. 11, (B) of FIG. 11, (C) of FIG. 11, and (D) of FIG. 11 are diagrams showing change of the content of a control program when synchronization is performed.

Figure 12:
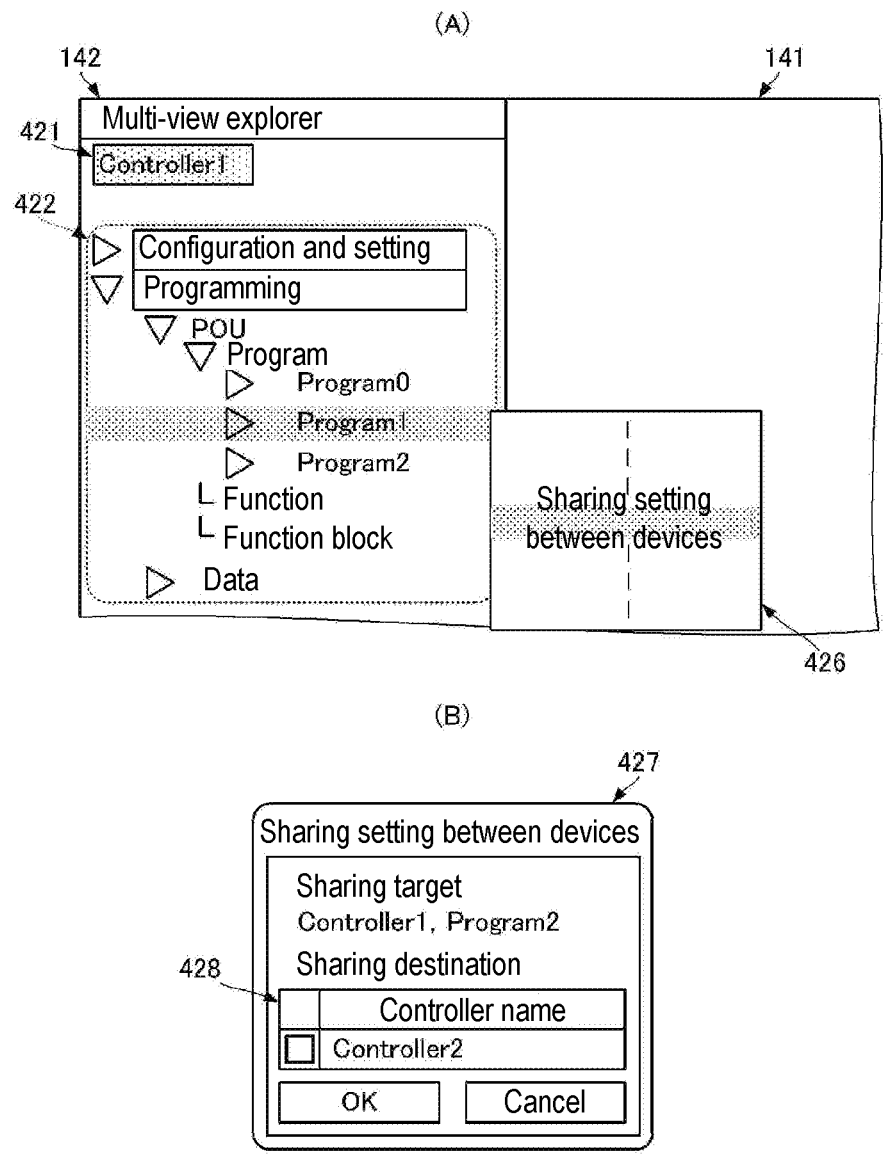

(A) of FIG. 12 is an enlarged diagram showing the multi-view explorer window when the sharing setting is changed, and (B) of FIG. 12 is an enlarged diagram of a sharing setting window.

DESCRIPTION OF THE EMBODIMENTS

Hereinafter, embodiments of the invention will be described with reference to the drawings.

Application Example

Figure 1:
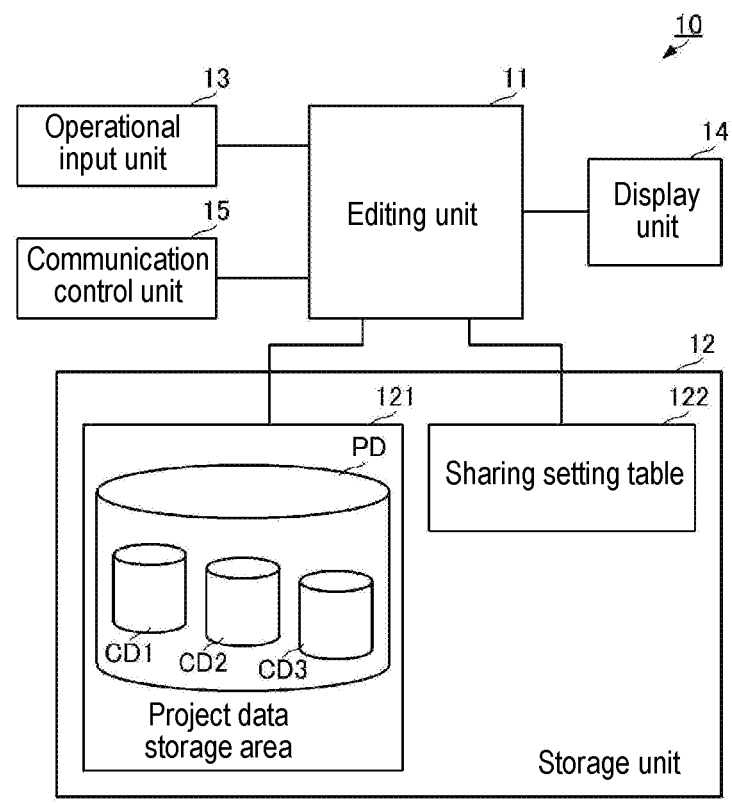
FIG. 1 is a functional block diagram of an information processing device according to an embodiment of the invention.

First, an example of application of the invention will be described with reference to FIG. 1. FIG. 1 is a functional block diagram of an information processing device according to an embodiment of the invention.

As shown in FIG. 1, the information processing device 10 includes an editing unit 11 and a storage unit 12. The editing unit 11 edits project data. The storage unit 12 has a project data storage area 121 and a sharing setting table 122.

The project data includes one or a plurality of pieces of controller data. The controller data includes one or a plurality of control programs. The sharing setting table 122 stores indications that the control programs respectively included in the plurality of pieces of controller data are set to be shared.

The editing unit 11 synchronizes the plurality of pieces of controller data with reference to the sharing setting table 122.

Configuration Example

Figure 2:
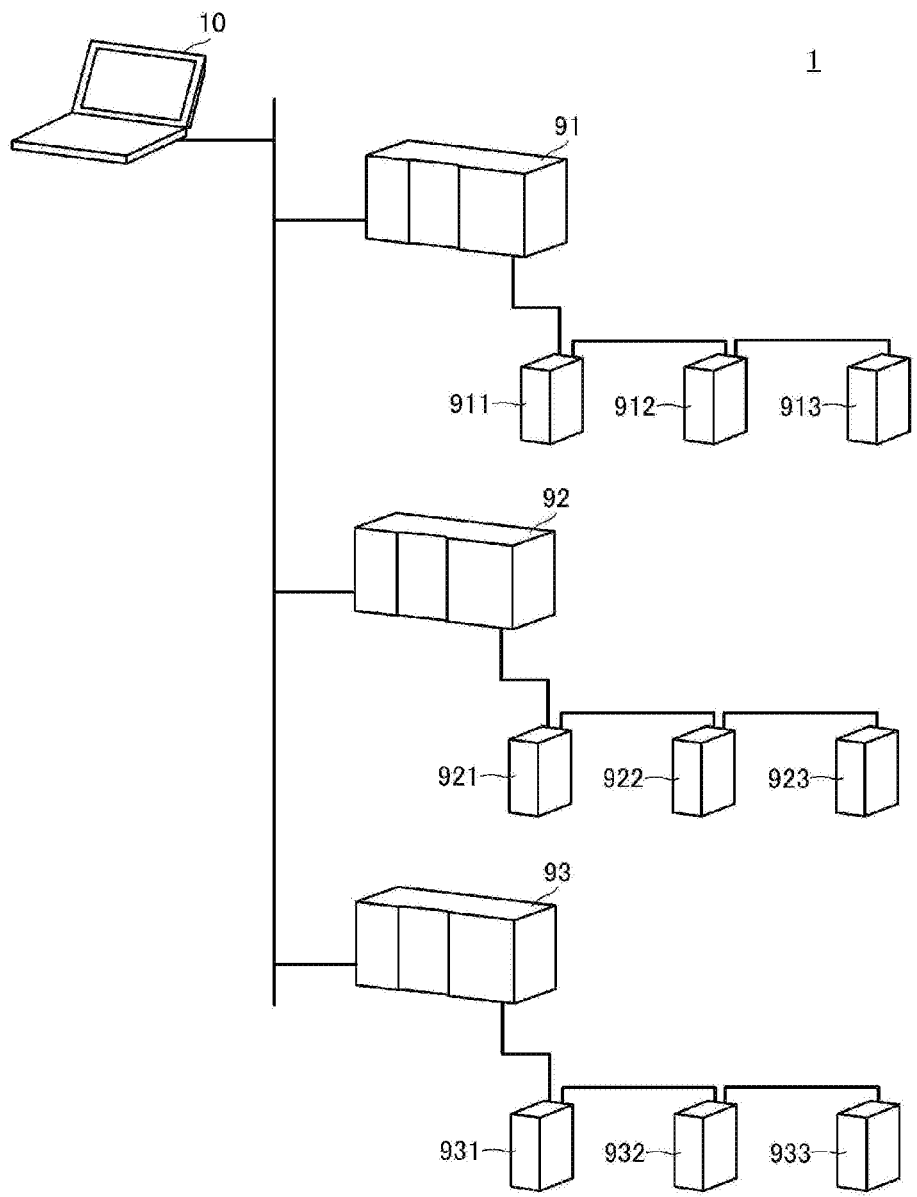
FIG. 2 is a block diagram showing the configuration of a control system to which the information processing device according to the embodiment of the invention is connected.

Next, the configuration of the information processing device according to the embodiment of the invention will be described with reference to the drawings. As described above, FIG. 1 is a functional block diagram of the information processing device according to the embodiment of the invention. FIG. 2 is a block diagram showing the configuration of a control system to which the information processing device according to the embodiment of the invention is connected. FIG. 3 is a diagram showing an example of the configuration of data created by the information processing device according to the embodiment of the invention. (A) of FIG. 4, (B) of FIG. 4, and (C) of FIG. 4 are diagrams showing an example of the sharing setting table according to the embodiment of the invention.

As shown in FIG. 1, the information processing device 10 includes the editing unit 11, the storage unit 12, an operational input unit 13, a display unit 14, and a communication control unit 15. The information processing device 10 is realized by, for example, a personal computer, etc.

In addition, as shown in FIG. 2, the information processing device 10 is included in the control system 1. The control system 1 includes the information processing device 10, a plurality of control devices 91, 92, and 93, and a plurality of control target devices 911, 912, 913, 921, 922, 923, 931, 932, and 933. The control devices 91, 92, and 93 are realized by, for example, a so-called PLC (Programmable Logic Controller). Further, the control target device 911 is a device used in a production line such as a sensor, a switch, a lamp, a motor, etc., for example. Nevertheless, the number of the control devices and the number of the control target devices are not limited to the illustration of FIG. 2 and are set as appropriate according to the control system to be realized.

The control device 91 is connected to the control target devices 911, 912, and 913 via a control network. The control device 92 is connected to the control target devices 921, 922, and 923 via a control network. The control device 93 is connected to the control target devices 931, 932, and 933 via a control network. The information processing device 10 is connected to the control devices 91, 92, and 93 via a data communication network.

The information processing device 10 creates and edits project data PD having the data configuration shown in FIG. 3.

As shown in FIG. 3, the project data PD has a plurality of pieces of controller data CD1, CD2, and CD3. The number of pieces of controller data included in the project data PD corresponds to the number of the control devices used in the control system 1 and is one or more.

Each of the controller data CD1, CD2, and CD3 has configuration data CFD and program data PRGD. The program data PRGD has a plurality of control programs PRG1, PRG2, and PRG3. The number of the control programs included in the program data PRGD corresponds to the number of the controls executed by the control device and is one or more. Further, the number of the control programs included in the program data PRGD may not be the same for all controller programs.

Here, for example, the controller data CD1 corresponds to the control device 91, the controller data CD2 corresponds to the control device 92, and the controller data CD3 corresponds to the control device 93. The configuration data CFD of the controller data CD1 is data that defines the configuration and specification (for example, the number of control target devices, EtherCAT, etc.) of the control system constituted by the control device 91 and the control target devices 911, 912, and 913. The configuration data CFD of the controller data CD2 is data that defines the configuration and specification (for example, the number of control target devices, EtherCAT, etc.) of the control system constituted by the control device 92 and the control target devices 921, 922, and 923. The configuration data CFD of the controller data CD3 is data that defines the configuration and specification (for example, the number of control target devices, EtherCAT, etc.) of the control system constituted by the control device 93 and the control target devices 931, 932, and 933.

Each of the control programs PRG1, PRG2, and PRG3 is a program indicating the control content that the control device executes on the control target device. For example, the control programs PRG1, PRG2, and PRG3 of the program data PRGD of the controller data CD1 are programs indicating the control contents that the control device 91 executes on the control target devices 911, 912, and 913. The control programs PRG1, PRG2, and PRG3 of the program data PRGD of the controller data CD2 are programs indicating the control contents that the control device 92 executes on the control target devices 921, 922, and 923. The control programs PRG1, PRG2, and PRG3 of the program data PRGD of the controller data CD3 are programs indicating the control contents that the control device 93 executes on the control target devices 931, 932, and 933.

As described above, the information processing device 10 creates and edits a plurality of pieces of controller data CD1, CD2, and CD3 respectively corresponding to a plurality of control devices as one project data PD with one editing program.

Each component of the information processing device 10 specifically has the following configuration.

The editing unit 11 includes, for example, a CPU, a RAM, a ROM, etc., and is realized by a device that executes the editing program of the project data. The storage unit 12 is realized by a device including a storage medium such as a hard disk, a solid state drive, etc.

The operational input unit 13 includes, for example, a keyboard, a mouse, a touch panel, etc. The operational input unit 13 receives an operation input from a user such as a programmer, and gives the operation input to the editing unit 11. The editing unit 11 creates and edits the project data PD according to the operation content.

The display unit 14 includes, for example, a liquid crystal display, etc. The display unit 14 displays the editing screen generated by the editing unit 11.

The communication control unit 15 includes, for example, a so-called network adapter, etc. The communication control unit 15 is connected to the data communication network shown in FIG. 2 and outputs the controller data CD1, CD2, and CD3 of the project data PD from the editing unit 11 to the control devices 91, 92, and 93.

The storage unit 12 has the project data storage area 121 and the sharing setting table 122. The project data storage area 121 stores the project data PD including the plurality of pieces of controller data CD1, CD2, and CD3.

The sharing setting table 122 stores a shared state of the control programs PRG included in each of the controller data CD1, CD2, and CD3. The shared state does not mean that the control program itself is shared and held between the plurality of pieces of controller data, but means a state where the content of the target control program is always the same between the plurality of pieces of controller data. For example, the mark ○ in (A) of FIG. 4, (B) of FIG. 4, and (C) of FIG. 4 and the mark ▲ in (B) of FIG. 4 indicate the shared state, and such a relationship is stored in the sharing setting table 122 as data.

In such a configuration, the editing unit 11 refers to the sharing setting table 122 to create and edit the plurality of pieces of controller data CD1, CD2, and CD3 constituting the project data PD. For example, when the content of the control program is changed, the editing unit 11 refers to the sharing setting table 122 and synchronizes the control program in the shared state with the changed control program. Here, the process of synchronizing the control programs is a process of matching the content of the control program in the shared state with the content of the control program changed by the editing operation. The process of matching the contents corresponds to the "synchronizing" process of the invention.

In the case of (A) of FIG. 4, when the control program Program0 of the controller data Controller1 (CD1) is changed, the control program Program0 of the controller data Controller2 (CD2) and the control program Program0 of the controller data Controller3 (CD3) are also changed to the same content.

However, in the cases of (B) of FIG. 4 and (C) of FIG. 4, even if the control program Program2 of the controller data Controller1 (CD1) is changed, the control program Program2 of the controller data Controller2 (CD2) and the control program Program2 of the controller data Controller3 (CD3) are not changed.

Further, in the case of (B) of FIG. 4, when the control program Program2 of the controller data Controller2 (CD2) is changed, the control program Program2 of the controller data Controller3 (CD3) is changed to the same content, but the control program Program2 of the controller data Controller1 (CD1) is not changed.

Thus, if the control program of one controller data is changed, the information processing device 10 automatically changes the content of the control program of other controller data which needs to have the same content. Therefore, it is necessary to include control programs having the same contents in the plurality of controller programs, and when these control programs are changed, the programmer can easily edit the control programs of a plurality of pieces of controller data.

Example of Specific Processing

A specific editing process executed by the editing unit 11 will be described with reference to the drawings.

(A) Creation of Controller Data

FIG. 5 is a flowchart showing an example of the process of creating the project data.

As shown in FIG. 5, the editing unit 11 receives an instruction to create project data and an instruction to create controller data from the operational input unit 13, and creates the controller data (S11). Then, the editing unit 11 creates configuration data and program data as the controller data (S12).

(A) of FIG. 6 is a diagram showing an example of the editing screen. (B) of FIG. 6 is an enlarged diagram showing an example of a multi-view explorer window in the editing screen.

When the editing program is executed, the editing screen 140 as shown in (A) of FIG. 6 is formed by the editing unit 11, and the editing screen 140 is displayed on the display unit 14. The editing screen 140 has a program editing window 141, a multi-view explorer window 142, and a tool window 143. The program editing window 141 is arranged at the center of the editing screen 140, and the multi-view explorer window 142 and the tool window 143 are arranged on both sides of the program editing window 141. In the program editing window 141, editing contents such as a control program, configuration data, etc. are displayed. In the multi-view explorer window 142, the configuration, hierarchy, etc. of the data and program to be edited are displayed. Although not shown, various tools for editing are displayed in the tool window 143.

As shown in (B) of FIG. 6, a controller name window 421 and a configuration tree 422 are displayed in the multi-view explorer window 142. The controller name window 421 displays the name of the currently edited controller program and the name of the editable controller program. In (B) of FIG. 6, only the name of the currently edited controller program is displayed. The configuration data, the configuration of the program data, and the tree structure included in the controller program displayed in the controller name window 421 are displayed in the configuration tree.

(B) Copying of Controller Data (Creation of Derived Device)

FIG. 7 is a flowchart showing an example of a process of copying controller data (creating a derived device). (A) of FIG. 8 is an enlarged diagram of the editing screen showing a state of instructing the process of copying controller data (creating a derived device), (B) of FIG. 8 is a diagram showing a state of selecting a tab for sharing all, and (C) of FIG. 8 is a diagram showing a state of selecting a tab for inheriting sharing setting.

As shown in FIG. 7, the editing unit 11 receives an instruction to copy controller data, that is, an instruction to create a derived device from the operational input unit 13 (S21). For example, as shown in (A) of FIG. 8, if a tab 424 for creating a derived device is selected by a predetermined operation input (for example, right-clicking and selecting with a mouse) when the controller data Controller1 is in the editing state, the editing unit 11 receives an instruction to copy controller data, that is, an instruction to create a derived device. Further, as shown in (B) of FIG. 8 and (C) of FIG. 8, when the type of sharing is selected by a newly displayed tab 425 for selecting sharing, the editing unit 11 also accepts this content. For example, by selecting the tab 425 of "share all" as shown in (B) of FIG. 8, the editing unit 11 accepts that all the control programs included in the controller data to be edited are the targets to be shared. On the other hand, by selecting the tab 425 of "inherit sharing setting" as shown in (C) of FIG. 8, the editing unit 11 accepts that only the control program, which is already in the shared state, included in the controller data to be edited is the target to be shared.

The editing unit 11 copies the controller data to be edited and creates new controller data according to the instruction to copy controller data, that is, the instruction to create a derived device (S22). The editing unit 11 assigns a name different from the controller data to be edited to the newly created controller data. Here, for example, the controller data to be edited is Controller1, whereas the copied controller data is assigned Controller2. The editing unit 11 stores the copied controller data in the project data storage area 121 of the storage unit 12.

The editing unit 11 determines a sharing inheritance condition according to the selected content of the tab 425 for selecting sharing (S23).

If the sharing inheritance condition is "share all" (S23: ALL), the editing unit 11 stores in the sharing setting table 122 that all the control programs of the controller data to be edited (the controller data of the copy source) and all the control programs of the controller data created by copying are in the shared state (S24). For example, it corresponds to the cases of copying from the controller data Controller1 to the controller data Controller2, copying from the controller data Controller1 to the controller data Controller3, and copying from the controller data Controller2 to the controller data Controller3 shown in (A) of FIG. 4, and copying from the controller data Controller2 to the controller data Controller3 shown in (B) of FIG. 4. Then, corresponding to these cases, the editing unit 11 stores in the sharing setting table 122 information indicating that they are in a shared relationship as indicated by the mark ○ in (A) of FIG. 4 and the mark ▲ in (B) of FIG. 4.

If the sharing inheritance condition is "inherit sharing setting" (S23: SEL), the editing unit 11 stores in the sharing setting table 122 that the control program that has already been set in the shared state in the controller data to be edited (the controller data of the copy source) and the control program that copies the control program in the controller data created by copying (the control program that is already in the shared state in the copy source) are in the shared state (S25). For example, it corresponds to the cases of copying from the controller data Controller2 to the controller data Controller3 shown in (B) of FIG. 4, and copying from the controller data Controller1 to the controller data Controller3 and copying from the controller data Controller2 to the controller data Controller3 shown in (C) of FIG. 4. Then, corresponding to these cases, the editing unit 11 stores in the sharing setting table 122 information indicating that they are in a shared relationship as indicated by the mark ○ in (B) of FIG. 4 and (C) of FIG. 4.

Thereby, the information processing device 10 can maintain the shared state of the control programs of a plurality of pieces of controller data. Further, the setting of the shared state is automatically stored and the programmer does not need to individually input the setting of sharing.

At this time, in the copied control program, each variable (for example, global variable) is copied to be the same as that of the control program of the copy source (synchronized), but the content of the variable (for example, value) is not copied (asynchronous). Thereby, in the case where the control target device is similar but the content of the variable has to be changed, it is possible to prevent the content of the same variable from being set unintentionally. As a result, a malfunction of the control target device is prevented.

The shared state is also displayed in the multi-view explorer window 142. (A) of FIG. 9 and (B) of FIG. 9 are enlarged diagrams of the multi-view explorer window when a control program in the shared state is present. (A) of FIG. 9 shows a case where a plurality of control programs Program0, Program1, and Program2 in the controller data Controller1 are in the shared state, and (B) of FIG. 9 shows a case where a program Program0 in the controller data Controller1 are in the shared state.

As shown in (A) of FIG. 9, when the control programs Program0, Program1, and Program2 are in the shared state, the editing unit 11 displays sharing marks 420 at the positions of the control programs Program0, Program1, and Program2 in the configuration tree 422. As shown in (B) of FIG. 9, when the control program Program0 is in the shared state, the editing unit 11 displays the sharing mark 420 at the position of the control program Program0 in the configuration tree 422.

By displaying such a sharing mark 420, the programmer can easily recognize the control program in the shared state with certainty.

(C) Synchronization of Controller Data

FIG. 10 is a flowchart showing an example of a process of synchronizing control programs between controller data.

The editing unit 11 receives an instruction to edit the control program of the controller data from the operational input unit 13, and edits the control program of the controller data (S31). The editing unit 11 refers to the sharing setting table 122 to detect whether the control program being edited is in the shared state (S32). If the control program being edited is in the shared state (S33: YES), the editing unit 11 synchronizes the control program of other controller data in the shared state with the control program being edited based on the sharing setting table 122 (S34). Here, the synchronizing process is to match the content of the control program of other controller data in the shared state with the content of the control program being edited.

On the other hand, if the control program being edited is not in the shared state (S33: NO), the editing unit 11 does not perform synchronization.

(A) of FIG. 11, (B) of FIG. 11, (C) of FIG. 11, and (D) of FIG. 11 are diagrams showing change of the content of a control program when synchronization is performed. (A) of FIG. 11 shows a state before editing the control program of the controller data Controller1, and (B) of FIG. 11 shows a state where the controller data Controller2 has been created by copying. (C) of FIG. 11 shows a state after editing the control program of the controller data Controller1, and (D) of FIG. 11 shows a state where the controller data Controller2 after synchronization has been created.

The editing unit 11 copies the controller data Controller1 to create the controller data Controller2, and thereby, as shown in (A) of FIG. 11 and (B) of FIG. 11, the same control programs are configured in the controller data Controller1 and the controller data Controller2. At this time, if sharing is set, the content thereof is stored in the sharing setting table 122.

The editing unit 11 edits the control program of the controller data Controller1 in this state. For example, as shown in (C) of FIG. 11, the content of the control program of the controller data Controller1 is added.

The editing unit 11 detects that the control program of the controller data Controller1 is in the shared state, and synchronizes the control program of the controller data Controller2 in the shared state with the control program of the controller data Controller1. That is, the editing unit 11 automatically changes the content of the control program of Controller2 to the content of the control program of the controller data Controller1. Thus, as shown in (D) of FIG. 11, the control program of the controller data Controller2 automatically matches the control program of the controller data Controller1 shown in (C) of FIG. 11.

When the same control program is used in a plurality of pieces of controller data, by executing such processing, if the control program of one controller data is edited, the control program of other controller data in the shared state is updated automatically. Therefore, the programmer can easily edit a plurality of pieces of controller data.

(D) Change of Sharing Setting (A) of FIG. 12 is an enlarged diagram showing the multi-view explorer window when the sharing setting is changed. (B) of FIG. 12 is an enlarged diagram of the sharing setting window.

As shown in (A) of FIG. 12, if a tab 426 for changing the sharing setting is selected by a predetermined operation input (for example, right-clicking and selecting with a mouse) when the controller data Controller1 is in the editing state, the editing unit 11 displays a sharing setting window 427 as shown in (B) of FIG. 12.

In the sharing setting window 427, the program, which is the sharing target, in the controller data being edited is displayed as a "sharing target". In addition, a table 428 for setting the sharing destination is displayed in the sharing setting window 427. The table 428 has a controller name (name of the controller program) and a check box for selecting whether to enter the shared state.

When an instruction to check the check box is received, the editing unit 11 sets the control program of the controller data which is the sharing target and the control program of the controller data of the sharing destination to the shared state. For example, in the case of (B) of FIG. 12, the editing unit 11 sets the control program Program2 of the controller data Controller1 and the control program Program2 of the controller data Controller2 to the shared state.

Further, when an instruction to cancel the check in the check box is received, the editing unit 11 sets the control program of the controller data which is the sharing target and the control program of the controller data of the sharing destination to cancel the shared state. For example, in the case corresponding to (B) of FIG. 12, the editing unit 11 sets the control program Program2 of the controller data Controller1 and the control program Program2 of the controller data Controller2 to cancel the shared state.

By using such a configuration and processing, the sharing setting can be changed as appropriate. Thereby, the programmer can edit a plurality of pieces of controller data freely.

The above illustrates an embodiment of setting the controller data for each control device. However, the invention can also be used for editing controller data when one of a plurality of pieces of controller data is selectively set according to the situations for one control device.

The embodiments of the invention described above are merely examples of the invention in every respect. It goes without saying that various modifications can be made without departing from the scope of the invention.

What is claimed is:

1. An information processing device, comprising a processor configured to:
   establish a connection to a first control device through a first connection;
   establish a connection to a second control device through a second connection;
   edit, through the first connection, first controller data including at least a first control program to be executed by the first control device;
   edit, through the second connection, second controller data including at least a second control program to be executed by the second control device; and
   store a sharing setting table indicating a sharing setting of the first control program and the second control program, wherein when the sharing setting of the first control program and the second control program are set to be shared, a content of the first control program and a content of the second control program are automatically synchronized such that the content of the first control program and the content of the second control program are always set to be the same, wherein when the content of the first control program is edited by the processor through the first connection, the processor is configured to automatically synchronize the content of the second control program with the edited content of the first control program by editing the content of the second control program by the processor through the second connection, such that the content of the second control program and the content of the first control program are always the same, wherein when the content of the second control program is edited by the processor through the second connection, the processor is configured to automatically synchronize the content of the first control program with the edited content of the second control program by editing the content of the first control program by the processor through the first connection, such that the content of the first control program and the content of the second control program are always the same.

2. The information processing device according to claim 1, wherein when the second controller data is created by copying the first controller data, if all the control programs included in the first controller data are selected to be shared, the processor is configured to set all the control programs included in the second controller data to share with all the control programs included in the first controller data, and stores the sharing setting in the sharing setting table.

3. The information processing device according to claim 1, wherein when the second controller data is created by copying the first controller data, if a sharing setting of the first control program included in the first controller data has been previously set and stored in the sharing setting table, then a sharing setting of the second control program copied to the second controller data is set to be the same as the sharing setting of the first control program included in the first controller data and is stored in the sharing setting table.

4. The information processing device according to claim 1, wherein when receiving a change of the sharing setting, the processor is configured to reflect a changed content in the sharing setting table.

5. The information processing device according to claim 1, wherein when synchronizing the first control program with the second control program or synchronizing the second control program with the first control program, the processor is configured to synchronize a variable used in the first control program and the second control program, and sets a content of the variable not to be synchronized.

6. The information processing device according to claim 1, comprising a display panel displaying an editing screen of the controller data,
wherein the processor is configured to assign a mark indicating the sharing setting to the control program set to be shared, and displays the mark on the display panel.

7. The information processing device according to claim 1, wherein the first control program is a PLC program and the second control program is a PLC program.

8. An information processing method, by which an information processing device comprising a processor executes:
establishing a connection to a first control device through a first connection;
establishing a connection to a second control device through a second connection;
editing, through the first connection, first controller data including at least a first control program to be executed by the first control device;
editing, through the second connection, second controller data including at least a second control program to be executed by the second control device; and
storing a sharing setting table indicating a sharing setting of the first control program and the second control program, wherein when the sharing setting of the first control program and the second control program are set to be shared, a content of the first control program and a content of the second control program are automatically synchronized such that the content of the first control program and the content of the second control program are always set to be the same,
wherein when the content of the first control program is edited by the processor through the first connection, the processor is configured to automatically synchronize the content of the second control program with the edited content of the first control program by editing the content of the second control program by the processor through the second connection, such that the content of the second control program and the content of the first control program are always the same,
wherein when the content of the second control program is edited by the processor through the second connection, the processor is configured to automatically synchronize the content of the first control program with the edited content of the second control program by editing the content of the first control program by the processor through the first connection, such that the content of the first control program and the content of the second control program are always the same.

9. A non-transitory computer-readable storage medium recording an information processing program enabling an information processing device comprising a processor to execute:
establishing a connection to a first control device through a first connection;
establishing a connection to a second control device through a second connection;
editing, through the first connection, first controller data including at least a first control program to be executed by the first control device;
editing, through the second connection, a second controller data including at least a second control program to be executed by the second control device; and
storing a sharing setting table indicating a sharing setting of the first control program and the second control program, wherein when the sharing setting of the first control program and the second control program are set to be shared, a content of the first control program and a content of the second control program are automatically synchronized such that the content of the first control program and the content of the second control program are always set to be the same,
wherein when the content of the first control program is edited by the processor through the first connection, the processor is configured to automatically synchronize the content of the second control program with the edited content of the first control program by editing the content of the second control program by the processor through the second connection, such that the content of the second control program and the content of the first control program are always the same,
wherein when the content of the second control program is edited by the processor through the second connection, the processor is configured to automatically synchronize the content of the first control program with the edited content of the second control program by editing the content of the first control program by the processor through the first connection, such that the content of the first control program and the content of the second control program are always the same.

* * * * *